United States Patent
Dietz et al.

(10) Patent No.: US 12,174,998 B2
(45) Date of Patent: Dec. 24, 2024

(54) MULTI-CONTROLLER OPT OUT SYSTEM AND METHOD

(71) Applicant: LiveRamp, Inc., San Francisco, CA (US)

(72) Inventors: Eloise Dietz, San Francisco, CA (US); Chris Fetterolf, Oakland, CA (US); Joshua Lang, San Francisco, CA (US); Henry Hartwell Swaffield, Knoxville, TN (US)

(73) Assignee: LiveRamp, Inc., San Francisco, CA (US)

( * ) Notice: Subject to any disclaimer, the term of this patent is extended or adjusted under 35 U.S.C. 154(b) by 210 days.

(21) Appl. No.: 17/782,302

(22) PCT Filed: Nov. 19, 2020

(86) PCT No.: PCT/US2020/061346
§ 371 (c)(1),
(2) Date: Jun. 3, 2022

(87) PCT Pub. No.: WO2021/113087
PCT Pub. Date: Jun. 10, 2021

(65) Prior Publication Data
US 2023/0004677 A1    Jan. 5, 2023

Related U.S. Application Data (60) Provisional application No. 62/943,897, filed on Dec. 5, 2019.

(51) Int. Cl.
*G06F 21/62* (2013.01)

(52) U.S. Cl.
CPC .. *G06F 21/6254* (2013.01); *G06F 2221/2115* (2013.01)

(58) Field of Classification Search
CPC ........... G06F 21/6254; G06F 222/2115; G06F 21/10; G06F 21/6218; G11B 20/00086;
(Continued)

(56) References Cited

U.S. PATENT DOCUMENTS 8,489,511 B2   7/2013  Coleman
8,606,746 B2   12/2013 Yeap et al.
(Continued)

OTHER PUBLICATIONS

Christen, Peter, "Record Linkage: Introduction, Recent Advances, and Privacy Issues," retrieved from the Internet http://users.cecs.anu.edu.au/~Peter.Christen/publications/christen2019csic-tutorial-slides.pdf (Jul. 2019).
(Continued)

*Primary Examiner* — Sargon N Nano (57) ABSTRACT

A system and method for processing a multiple data controller workflow fully honors data subject opt-outs but nevertheless takes advantage of the synergy of the combined data from multiple controllers to improve the effectiveness of messaging. A data services provider performs data resolution processing against the data from each data controller. Using the results of the resolution processing, opt-out lists that are in different formats and that may track different sorts of data may all be used for the joint campaign. Metadata is added to the data so that the source data controller is tracked through the processing. The data is then combined, resulting in a master opt-out list. If a data subject has opted out with respect to any controller, then the opt-out is applied to the joint campaign.

19 Claims, 2 Drawing Sheets

(58) Field of Classification Search
CPC ... G11B 20/0021; H04L 63/20; H04L 63/102; H04L 2463/101; H04L 63/12
USPC .......................................... 726/1, 26, 27, 30
See application file for complete search history.

(56) References Cited

U.S. PATENT DOCUMENTS

| | | | |
|---|---|---|---|
| 8,666,822 B1* | 3/2014 | Kaliss | G06Q 10/10 |
| | | | 705/14.73 |
| 9,092,828 B2 | 7/2015 | Hosp | |
| 9,830,473 B1 | 11/2017 | Clark et al. | |
| 10,264,447 B2* | 4/2019 | Al-Kabra | H04L 9/3239 |
| 10,362,067 B2 | 7/2019 | Sachs | |
| 11,270,025 B2* | 3/2022 | Arnold | G06F 21/602 |
| 11,907,266 B2* | 2/2024 | Wilshinsky | G06F 9/547 |
| 2004/0153908 A1 | 8/2004 | Schiavone et al. | |
| 2005/0060417 A1 | 3/2005 | Rose | |
| 2010/0332304 A1 | 12/2010 | Higgins et al. | |
| 2012/0057595 A1* | 3/2012 | Awano | H04L 63/0421 |
| | | | 370/392 |
| 2012/0059906 A1* | 3/2012 | Ciancio-Bunch | G06F 16/245 |
| | | | 709/217 |
| 2015/0379303 A1* | 12/2015 | LaFever | G06F 21/6254 |
| | | | 726/28 |
| 2015/0381579 A1* | 12/2015 | Lundin | G06F 21/6263 |
| | | | 713/168 |
| 2016/0140580 A1 | 5/2016 | Calo | |
| 2017/0169253 A1* | 6/2017 | Curcio | G06F 21/6254 |
| 2017/0249481 A1* | 8/2017 | Edison | H04L 63/083 |
| 2019/0005210 A1 | 1/2019 | Wiederspohn et al. | |
| 2019/0058991 A1* | 2/2019 | Al-Kabra | H04L 63/0421 |
| 2019/0251292 A1* | 8/2019 | Barbas | H04L 9/00 |
| 2021/0173854 A1* | 6/2021 | Wilshinsky | G06F 16/906 |
| 2021/0383016 A1* | 12/2021 | Kothavale | G06F 21/6245 |

OTHER PUBLICATIONS

European Patent Office extended European search report for Application No. 20895355.4 (dated Oct. 20, 2023).
Boyd, Virginia, "Financial Privacy in the United States and the European Union: A Path to Transatlantic Regulatory Harmonization," Berkeley J. of Int'l Law, vol. 24:3, pp. 939-1008 (2006).

* cited by examiner

Fig. 2

MULTI-CONTROLLER OPT OUT SYSTEM AND METHOD

CROSS-REFERENCE TO RELATED APPLICATIONS

This application claims priority to U.S. Provisional Patent Application No. 62/943,897, filed on Dec. 5, 2019. Such application is incorporated by reference herein in its entirety.

BACKGROUND OF THE INVENTION

The field of the invention is controlling opt-outs in a multi-controller environment using a data processing system that includes personally identifiable information (PII).

In order to prepare targeted messages to customers and potential customers, many businesses maintain data concerning consumers. These businesses include retailers, who maintain data concerning their own customers, as well as third-party data providers, who may maintain data about a large number of consumers in a given geographic region. Businesses who maintain data about consumers are subject to a growing number of data privacy laws, regulations, and rules in various jurisdictions, including, for example, the European Union's General Data Protection Regulation (GDPR). All of these laws, regulations, and rules will be referred to herein generally as "privacy laws." The businesses who maintain these data processing systems must ensure that their technology enables them to comply with the privacy laws that are applicable to them.

One of the privacy law requirements applicable in many jurisdictions is the technological ability to restrict processing of personal data upon the request of the person who is the subject of the data. This is commonly referred to as allowing for "opting out" or "opt-out" for the use of this data. Under the GDPR, the businesses with consumer data are each considered a "data controller," which is a natural or legal person, public authority, agency or other body which, alone or jointly with others, determines the purposes and means of the processing of personal data. The term "joint controllers" is used to describe a situation in which two or more controllers jointly determine the purposes and means of processing. A "data processor" is a natural or legal person, public authority, agency or other body which processes personal data on behalf of the controller. An example of a data processor is a data services provider (DSP) who receives consumer data from a retailer and provides processing on behalf of the retailer as part of a campaign of providing targeted messages. A "data subject" is an identified or identifiable natural person, such as a consumer.

The GDPR includes a "right of restriction," which means that a data subject can request restriction of processing of data about that data subject. When a restriction request is received, the controller cannot transfer the data to a data processor for processing and may not itself process the data. This right of restriction will generally be considered as one form of "opting out" herein. The controller must be able to process the opt out requests within its data processing system, and thus must implement and maintain hardware and software technology for this purpose. A common strategy is to maintain an opt-out list. In an example, a data subject may contact a controller, provide contact information such as an email address, and tell the controller to stop sending the data subject targeted messages. The controller then adds the data subject's email address to its opt-out list. This opt-out list is forwarded to the data processor that works with the controller so that the data processor may similarly avoid any targeted messages that would otherwise reach this data subject. Thereafter, when the data processor processes data for that controller, directed messages to the data subject's email address will be suppressed, that is, not sent.

Opt-out lists as just described are workable in an environment in which there is only one controller, but problems arise when multiple controllers wish to engage in a joint campaign of targeted messaging. For example, one may suppose that an airline, a car rental company, and a hotel chain wish to engage in a joint campaign. They may wish to offer a discount to those consumers who use all three of these companies' services when booking a trip. Each company will wish to contribute its own customer data to make the campaign effective, and may wish to employ a data services provider (DSP) to process the data and generate information for online messaging. Because the companies may have different but complementary information about the same consumers, combining their data will allow them to better formulate a targeted message offer that will be of interest to such consumers.

In the joint campaign scenario just described, the airline, car rental company, and hotel chain are each data controllers, and the DSP is a data processor. Each will have its own opt-out list associated with its own customers. But the data from each of the three data controllers will often be in different formats. For example, the airline may have a frequent flier program, which is keyed by name, address, and an internal customer number. The rental car company might use name and email address data. The hotel may use name and telephone number data. When processing data for this multi-controller workflow, the DSP would want to use the combined properties of the three data sets to enhance the targeted messages presented to a given data subject. But the DSP must also respect the opt-out requests made by consumers to each of the three data controllers. It may be that a data subject has opted out with respect to one or two of the three data controllers, but has not opted out with respect to all three of them. If the DSP chose a single opt-out list to work with, it would not be honoring the opt-out requests of any consumers who had opted out with respect to one of the other data controllers. As a result, the campaign would not comply with the data subject opt-out requests and may, depending upon the jurisdiction, be out of compliance with applicable privacy laws. The DSP also cannot simply merge the opt-out lists, because the data is kept in different formats and different identifiers are used to distinguish between the companies' respective customers. The DSP could process data separately for each of the data controllers and use each data controller's opt-out list when processing its data separately, but then the synergy of combining the complementary data from the multiple controllers would be lost, and the campaign would thus be less effective.

It may be understood that this same technical problem as described above is presented when any two or more data controllers wish to engage in a joint campaign. Another example of where this problem arises is when a company uses data collected by another company, whereby both the data seller and data purchaser are in the role of data controllers. Still another example is multiple companies sharing responsibility for collecting and maintaining a commingled dataset, in which all contributors would be considered data controllers. The prior art systems for processing opt-outs would not provide compliance with privacy laws such as the GDPR in any of these situations. What is desired then is an improved data processing system and method that would technically facilitate full compliance with opt-out requests while still allowing for a joint campaign involving multiple data controllers and other joint uses of data.

References mentioned in this background section are not admitted to be prior art with respect to the present invention.

BRIEF SUMMARY OF THE INVENTION

The present invention is directed to a system and method for processing a multiple data controller workflow, whereby data subject opt-outs are fully honored but the synergy of the combined data may still be achieved for purposes of improving the effectiveness of a campaign. The DSP performs data resolution processing against the data from each data controller. Using the results of the resolution processing, opt-out lists that are in different formats and may track different sorts of data may all be used for the joint campaign. Even though data is being pulled from multiple controllers and is processed together in a multi-controller workflow, metadata is added to the data so that the source data controller is tracked throughout the processing by the DSP. The data is then combined at the end, resulting in a master opt-out list. If a data subject has opted out with respect to any controller in the multiple data controller workflow, then the opt-out is applied to the joint campaign even though one of the controller's data may not strictly be covered by the data subject's opt-out request. The invention thereby fulfills the intent of the data subject by applying the opt-out directive to data collected by each controller. The combined opt-out only applies, however, to the multiple data controller workflow, such that individual data controller workflows would still retain data subject records, potentially lacking an opt-out request from the data subject.

In various implementations of the present invention, a number of advantages are offered by this approach. The DSP is able to isolate the data from multiple data controllers from each other, and thereby maintains confidentiality for all controllers with respect to other controllers. No company that is participating in the joint enterprise needs to divulge any of its customer data to another company. This serves both to protect the privacy of the data subjects and also allows the controllers to comply with privacy laws and their own stated privacy policies. It thus encourages controllers to engage in multiple controller campaigns with the assurance that their data is protected, thereby improving the results of the campaign and providing their customers with offers that will more likely be attractive to them.

Another advantage of the approach according to certain implementations of the invention is that by applying identity resolution to the opt-out process, the likelihood that the data subject's actual wishes will be honored is improved. For example, suppose that a data subject has multiple email addresses that are known to the DSP, but only gives one of those email addresses in an opt-out request to one of the data controllers involved with the joint campaign. The resolution process will allow the DSP to apply an opt-out against all of those email addresses, not just the one provided to the data controller when the data subject made the opt-out request. The system and method thus may go beyond the strict requirements of the applicable privacy laws, but comes closer to honoring the actual intent of the data subject, and thus reduces the risk that the data subject will be angered by receiving a message during the joint campaign when the data subject thought that his or her opt-out request should have prevented that message. This is beneficial for the data controllers involved in the joint campaign as well, since they do not risk losing a customer due to anger at being targeted in the joint campaign when the customer expected not to receive such messaging.

Another advantage of certain implementations of the present invention is that when data controllers transmit data to the DSP, the ingestion process replaces all identifiable personal information with anonymous identifiers. For example, if the input data contained "John Doe, j.doe@mail.com," this might be replaced with "f572d396fae9206628714fb2ce00f72e94f2258f." The DSP may protect the data with security measures, but pseudonymization of this sort provides a further layer of defense against data breaches. Even if the data were breached by malicious actors, such actors would be unable to re-associate any anonymous identifier with the original name and email address. This protects the actual identifiable information (names, addresses, etc.), and it protects the relationship between other data (purchase history, product references, etc.) and any particular individual.

Another advantage of certain implementations of the present invention is that, just as the data controllers are isolated from each other during the multi-controller processing, the DSP also isolates the data controllers from online message delivery platforms. When a person interacts with a website, that website might use a login or other identity to establish an on-line "session." For example, when someone logs into a Facebook account, Facebook knows the identity associated with that session's activity. When reporting message activity from the website, the DSP may anonymize the records to dissociate the activity (e.g., clicking on a banner message) from specific individuals. Data controllers can receive aggregate reports to measure the effectiveness of their targeted messaging, but data controllers cannot associate specific website activity to specific data subjects. Again, this feature serves to further protect the privacy of individual consumers.

These and other features, objects and advantages of the present invention will become better understood from a consideration of the following detailed description of the preferred embodiments in conjunction with the drawings as described following:

DETAILED DESCRIPTION OF THE PREFERRED EMBODIMENT(S)

Before the present invention is described in further detail, it should be understood that the invention is not limited to the particular embodiments described in any section of the specification, and that the terms used in describing the particular embodiments are for the purpose of describing those particular embodiments only, and are not intended to be limiting, since the scope of the present invention will be limited only by the claims.

Figure 1:
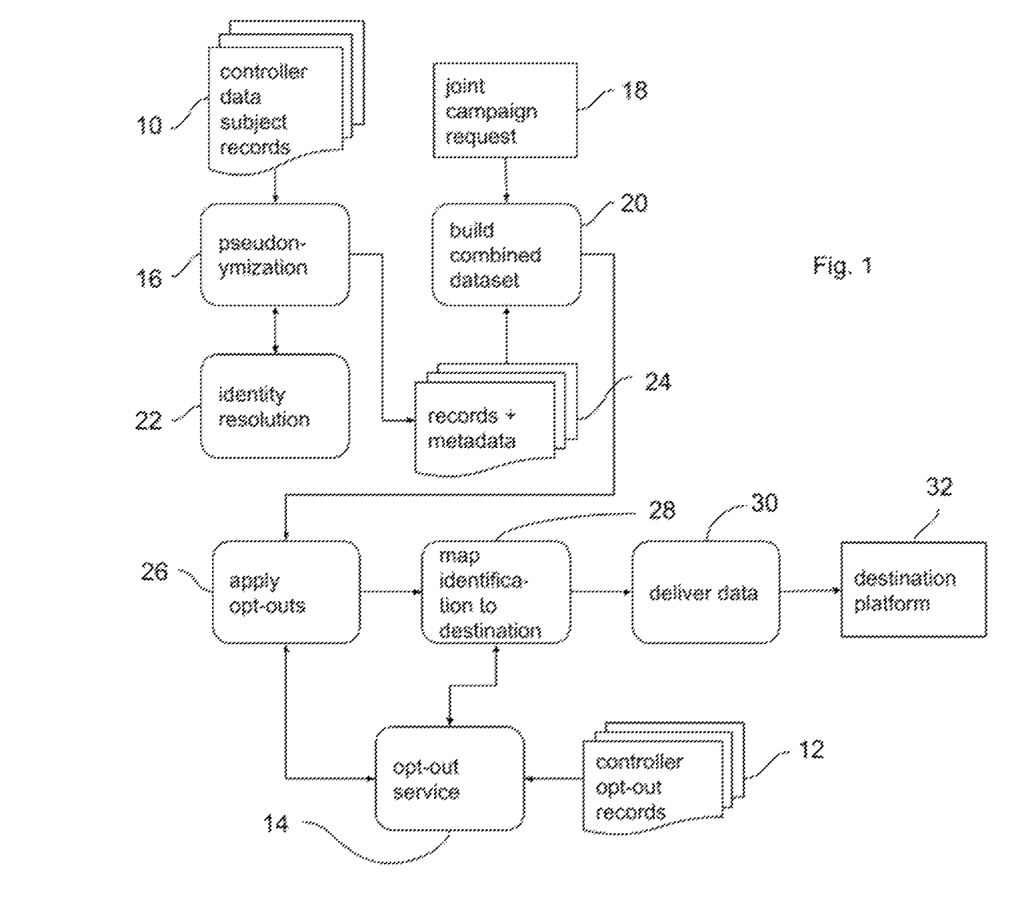
FIG. 1 is a data flow diagram depicting a method according to an implementation of the invention.

A method according to an implementation of the present invention may be described with reference to the data flow diagram of FIG. 1. Data controllers maintain records for data subjects as controller data subject records 10. Typically, data subjects are customers (or potential customers). The number of such records may be quite large, with some companies maintaining records for millions of customers. The records include customer details, such as contact information, purchase history, buying preferences, demographic information, etc. Companies (data controllers) are interested in maintaining existing customers, gaining the confidence of new customers, and improving targeting effectiveness. Thus, companies gather information they believe will help this effort. To make the data effective for online targeted messaging, the customer records must be converted to a format that can be used by destination programmatic messaging platform or platforms 32.

Separate from data subject records 10, a data controller maintains controller opt-out records 12. These controller opt-out records 12 are maintained, as explained above, in order to comply with applicable privacy laws and to comply with the data controller's own stated privacy policies. When a data subject contacts a controller directing that controller to restrict processing in some way, the controller adds the subject's request to the opt-out records. The controller periodically transmits those controller opt-out records 12 to data processors, thus propagating the subject's request to other entities that might have access to the subject's data for purposes of managing a campaign. In FIG. 1, controller opt-out records 12 refers to the opt-out records sent to the data processor from one or more data controllers.

When the data services provider (DSP) receives controller data subject records 10 from a data controller, it first pseudonymizes the records at pseudonymization step 16. This means replacing any personally identifying information with anonymous identifiers. Further, the records are augmented with metadata, adding an identifier or tag corresponding to the data controller that supplied the records. The result of this step is a new data set, data subject records+ metadata records 24. For example, a record sent from car rental company Drive-Rite with "John Doe, j.doe@mail.com" might have the name and email replaced with "f572d396fae9206628714fb2ce00f72e94f2258f", and a metadata tag added to note Drive-Rite as the data controller.

The anonymous identifiers are obtained through identity resolution processing step 22. Identity resolution step 22 eliminates minor differences in the identifying information. Thus, if one controller has "John Doe" and another has "John Q. Doe", both with the same email address, identity resolution 22 likely will return the same anonymous identifier for both records. This standardization ensures that the same anonymous identifier will be generated for the same consumer on a consistent basis. In one example, the anonymous identifier may be generated by applying a hashing algorithm. Any tiny difference in the input character strings to a hashing algorithm will result in a different anonymous identifier, so the standardization at identity resolution step 22 ensures that like consumers have like anonymous identifiers regardless of the data controller supplying the data. In this way, complementary data from different data controllers in a multi-controller environment may be used together to improve the results of the campaign.

After substitution of personally identifiable data with anonymous identifiers occurs, there is no permanent account of the correspondence between the original identifying data (John Doe, j.doe@mail.com) and the anonymous data ("f572d396fae9206628714fb2ce00f72e94f2258f"). This translation thus blocks re-identification in both directions. Entities in the online world, such as destination programmatic messaging platforms 32, cannot associate the anonymous identifier with a known person. Likewise, the original data controller cannot connect a known person with online activity. Two-way pseudonymization in certain implementations of the present invention thus protects a data subject's information from unethical data use.

The DSP relies on data controllers to forward opt-out data in the form of controller opt-out records 12 in addition to controller data subject records 10. That is, regular controller data subject (customer) records 10 include identifying information and properties (purchase history, preferences, survey results, etc.). In contrast, controller opt-out records 12 include only identifying information, telling the DSP to place a given data subject (or subjects) on the controller-specific suppression list. When processing data from the controller, the DSP suppresses all records associated with any subject in the suppression list, as will be more fully set forth below.

It will be understood that records for the same data subject must be coordinated through identity resolution step 22, not only for matching anonymous identifiers but also to make the complementary data useful together. The controllers can use different identifying information (names, email, phone, address, etc.), with possible variations in content and spelling, but the effectiveness of the joint campaign relies on resolving the differences. Identity resolution step 22 creates a common understanding of data subject identities. After the pseudonymization process, all the original identifying information has been resolved, common identities have been determined, and the same anonymous identifiers have been assigned to matching records. The matching identifiers can be found in apply opt-outs step 26 for source identifiers, or in map identifiers to destination step 28 for destination identifiers, as more fully explained below. Each dataset remains distinct; the datasets themselves are not merged. But the anonymous identifiers have been chosen from a common framework, and that allows correlation of subject records across datasets from multiple data controllers. The shared framework for anonymous identifiers allows the opt-out processing to use a data subject's opt-out request, originally directed to any data controller and forwarded to the data processor, for the aggregate dataset. Any data subject's opt-out request, to any controller in the workflow, is applied to all records in the workflow.

To initiate a multi-controller workflow, multiple companies send data records to the DSP and mutually authorize the DSP to combine their data for distribution to programmatic messaging platforms. To protect privacy, the data are not shared among the controllers. Each controller retains sole possession of the original controller data subject records 10 submitted by that controller. Note that in some cases, one or more controllers might not actually contribute data to the workflow, depending on the type of multi-controller arrangement. The key point here is that multiple controllers are associated with the workflow, even though only one set of incoming controller data is shown in FIG. 1 for clarity.

Information from multiple controllers is combined to build combined dataset step 20. Without exchanging data, each controller benefits from the information contributed by the other controllers. For example, if one controller knows a customer likes to travel in April, and another controller knows the same customer stays in resort hotels, the combined information might be used to offer special pricing on a tropical spring vacation. Traditionally, each controller would have access only to the data it had collected. Any use for online targeted messaging would operate with boundaries, separating one controller's information from another.

When processing controller opt-out records 12, the DSP cannot rely on the controller opt-out records 12 containing every identity known for a data subject. For example, a regular controller data subject record 10 from a controller might include name, email, phone, and customer number. That same controller might send controller opt-out records 12 that contain only the customer number. The DSP performs identity resolution step 22 not only on the controller data subject records 10 but also on the controller opt-out records 12, using previous, full data subject records to associate the customer number with a data subject's name, email, and phone number. Each of these attributes is added to the suppression list maintained for the given data controller. When processing subsequent data records and applying opt-out suppression at opt-out service 14, this identity resolution step 22 allows the DSP to recognize records for the data subject that might have only a phone number, without specifically requiring every record to contain the opt-out record identifiers. Thus, the opt-out suppression process of opt-out service 14 more completely represents the data subject's intent, without requiring full coordination between the data controller and data processor.

After forming the joint dataset at build combined dataset step 20, the DSP workflow applies opt-out suppression at apply opt-outs step 26. Data processors must respect the opt-out directives from data subjects (even when the directives are received indirectly through a data controller). That means dropping any record that belongs to a data subject with an opt-out request as identified in controller opt-out records 12. When processing data from a single data controller, this checking is straightforward. If a person opts out with Controller C, the controller forwards that request to the DSP and updates the opt-out suppression list maintained for Controller C. When the DSP processes data on behalf of Controller C, it applies that specific suppression list and drops any records for data subjects in the list.

Applying opt-outs for multiple controllers involves subtlety to respect data subject rights. The combined dataset might include records for a given data subject, some of which are covered by an explicit opt-out and others that are not covered. For example, John Doe might have opted out with Fly-Rite airlines but not with Stay-Rite hotels. (Perhaps Doe travels frequently by car, often books rooms with Stay-Rite, and appreciates the discount coupons he receives by email.) In a single-controller workflow, Stay-Rite could use Doe's data. The situation changes, however, with multiple controllers. The combined dataset includes records from all controllers for the workflow. Each data subject record is the union of all such records from any controller in the workflow. The DSP supports data subject rights by applying the union of all controllers to every record. Thus, if a data subject has opted out with any data controller, that opt-out applies to the entire dataset. When suppressing records for opt-out processing, the workflow extracts the data subject from each record, contacts the opt-out service 14, and requests the status for all data controllers from the joint campaign request 18. The record identifiers include both input and output. Thus, it is possible that destination identifiers, known only in map identifiers to destination step 28, may be subject to an opt-out directive. If an opt-out request exists for any controller, the DSP's workflow drops the record.

The remaining records are then prepared for transmission to destination programmatic messaging platform 32 at deliver data step 30. This involves another anonymous identifier translation. The anonymous identifiers stored in the data subject records+metadata records 24 are kept internal to the DSP. Ethical treatment of data subject data ensures the two-way privacy mentioned above: data controllers cannot associate data subject records with specific online activity, and online programmatic messaging platforms cannot associate online activity with specific data subject records. Thus, the internal anonymous identifiers are transformed, replacing them with new identifiers created specifically for the destination programmatic messaging platform 32.

It may be understood from the above walkthrough of the method that the DSP dynamically synthesizes a joint dataset when necessary, using component datasets provided by individual data controllers. Each controller manages its own dataset(s), without the involvement of other controllers. Data subjects are identified in unique ways, and the semantics of data in each dataset are specific to each controller. No prior agreements or technical exchanges among the controllers are needed to initiate a multi-controller workflow. Instead, the controllers contact the DSP, describe the individual datasets to use, specify what data to synthesize, and define what destination targeted messaging platform should receive the delivery.

When creating a combined dataset, the DSP dynamically synthesizes a joint controller relationship. Regardless of the data controller associated with each component dataset, and thus regardless of the data controller for individual records and subject properties, the joint controller set is created to cover the entirety of the processing workflow. The joint controller set is used for all data regulation compliance, including opt-out processing. Record suppression, which normally applies a single data controller, uses the joint controller set. All controllers are applied to all records, enforcing the data subject's intent for exercising his or her opt-out rights. In a typical joint controller arrangement according to the prior art, all controllers would agree on data formats and content. Data subject (customer) records would be shared, and all controllers would have physical and semantic access to the information. In particular, the identification of data subjects would be done in one way, affecting all records in the dataset. This invention, as described in the implementations set forth herein, includes technology that allows full separation among the component datasets without any sharing of data between joint controllers. It thus automates compliance with applicable privacy laws and various data controller and processor privacy policies.

Critically, a multi-controller workflow as described above would not be allowed under many privacy laws without a system to enforce data subject rights on the aggregate dataset. These privacy laws specifically require data controllers to enforce data subject opt-out requests. By its structure, an aggregate dataset is subject to the opt-out directives from all the data controllers. Without a mechanism to enforce subject rights across the aggregate dataset, that aggregate dataset would violate the privacy laws existing in a number of jurisdictions.

Figure 2:
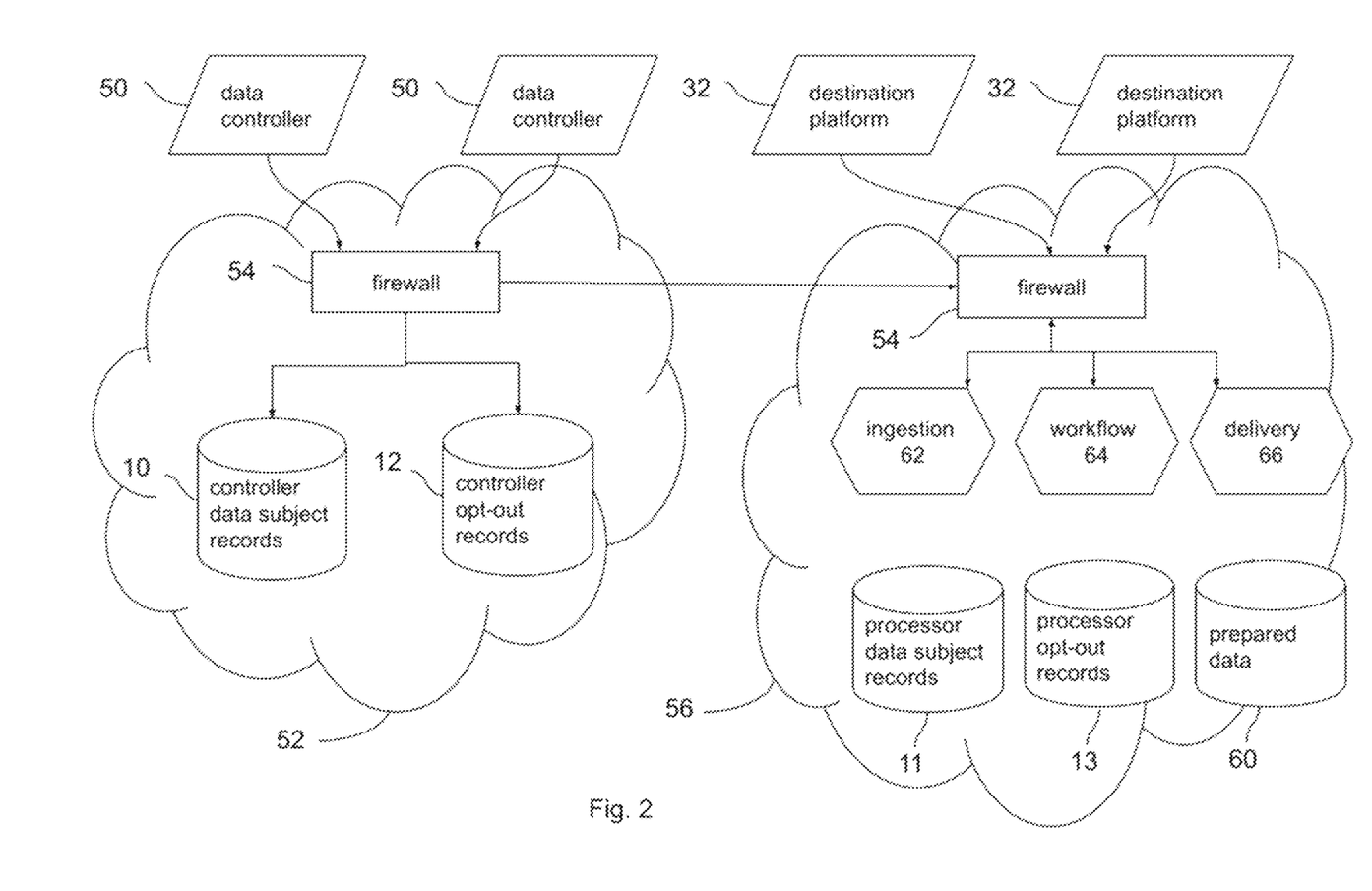
FIG. 2 is an architectural diagram of a hardware and software computing system for implementing the method of FIG. 1 according to an implementation of the invention.

A hardware and software system for implementing the method just described according to an implementation of the present invention may be described with respect to FIG. 2. This system may be implemented as virtual "compute engines" (shown as hexagons in FIG. 2) in a cloud computing environment. Likewise, each storage system (shown as cylinders in FIG. 2) may be implemented as virtual components in a cloud computing environment. Each such component may be physically implemented as one or more subcomponents, conceivably implemented on thousands of processors within a particular cloud computing environment or across multiple such environments. Likewise, the firewall switches (shown as rectangles in FIG. 2) may include one or many public and private network switches and routers.

Data controller systems 50 communicate with public cloud platform 52 through a firewall 54. Although only two data controller systems 50 are shown in FIG. 2, it is understood that the present invention in various implementations may be used with any number of data controller systems 50. This architecture allows for the storage of controller data subject records 10 and controller opt-out records 12 (as also shown in FIG. 1) for use by the DSP within public cloud platform 52. Public cloud platform 52 may communicate with data processor cloud platform 56 through firewalls 54. For the processing performed by the DSP, processor data subject records 11 and processor opt-out records 13 are stored locally at data processor cloud platform 56. Likewise, prepared data storage 60 may be used for storage of the final result of the system, including data to be delivered at deliver data step 30 of FIG. 1. Three different compute engines may be used to perform the processing steps shown in FIG. 1: ingestion compute engine 62, workflow compute engine 64, and delivery compute engine 66. The results from delivery compute engine 66 are routed through the firewall 54 of data processor cloud platform 56 to one or more destination platforms 32. This is a single example, but it should be understood that in alternative implementations of the present invention the processing steps may be divided into more or fewer logical compute engines or physical compute engines, as required given a particular cloud or non-cloud computing environment.

In addition to technologically allowing for joint campaigns while maintaining automatic compliance with privacy laws, in these implementations the present invention reduces the associated computational cost of performing the required processing. As noted above, a campaign with three data controllers could be simulated by running three separate workflows. Each workflow would process a single dataset and apply the data controllers' required processing. These individual workflows incur overhead for scheduling, resource allocation, execution, monitoring, etc. If a single workflow costs $1 \times W$ to compute, then three workflows would cost approximately $3 \times W$. But a joint campaign as described herein changes this computational cost structure significantly. All three datasets may be processed in parallel in a single workflow. Moreover, the processing to enforce data regulation can be done once on the combined controller set, adding virtually no incremental cost over a single controller. Again, if the cost of a single dataset's workflow is $1 \times W$, the cost of a joint campaign with three datasets in these implementations of the present invention is roughly $1 \times (W+3i)$, where "i" represents the incremental cost. As a practical matter, it will be seen that $1 \times (W+3i)$ will be much less than $3 \times W$. Suppose, for example, that the basic workflow cost is $W=100$, and the incremental cost of a joint campaign is $i=5$. That is, running the joint workflow adds 5% computing complexity for each dataset in the workflow. It will be seen then that the cost for three individual workflows is $3 \times W=300$, whereas the cost for a joint campaign is only $1 \times (W+3i)=115$. Thus, the invention in these implementations both improves functionality, allows for compliance with applicable privacy laws, and reduces aggregate computing costs, all at the same time. These computing cost savings increase as the number of participating controllers in the joint campaign increases, thus leading to even greater efficiency in campaigns with a larger number of controllers contributing data.

In the implementations described herein and in various alternative implementations, the present invention may be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the solid state drives attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The invention claimed is:

1. A system for managing multi-controller opt-outs, comprising:
at least one memory storing sequences of instructions; and
at least one processor configured to execute the sequences of instructions which, when executed, causes the at least one processor to perform:
performing identity resolution against a first set of data subject records from a first controller to identify a data subject associated with each of the data subject records in the first set of data subject records;
performing identity resolution against a second set of data subject records from a second controller to identify the data subject associated with each of the data subject records in the second set of data subject records;
augmenting the first set of data subject records with metadata comprising a first controller identifier uniquely associated with the first controller to produce a first set of data subject plus metadata records;
augmenting the second set of data subject records with metadata comprising a second controller identifier uniquely associated with the second controller to produce a second set of data subject plus metadata records;
building a combined dataset from the first set of data subject plus metadata records and the second set of data subject plus metadata records; and
with a first set of opt-out records comprising a first list of opted-out data subjects and associated first type of personally identifiable information and a second set of opt-out records comprising a second list of opted-out data subjects and associated second type of personally identifiable information, applying an opt-out service against the combined dataset to suppress records in the combined dataset matching either of the first set of opt-out records and the second set of opt-out records, wherein the first list of opted-out data subjects and the second list of opted-out data subjects each comprise a list of data subjects comprising persons who have requested that processing of their personal data be restricted, and wherein no personally identifiable information from the first set of data subject records from the first controller is shared with the second controller, and no personally identifiable information from the second set of data subject records from the second controller is shared with the first controller.

2. The system of claim 1, wherein the sequences of instructions, when executed, further cause the at least one processor to perform pseudonymization against the first set of data subject records prior to performing identity resolution against the first set of data subject records and pseudonymization against the second set of data subject records prior to performing identity resolution against the second set of data subject records.

3. The system of claim 1, wherein the sequences of instructions, when executed, further cause the at least one processor to replace any personally identifiable information in the first set of data subject records and second set of data subject records with anonymous identifiers.

4. The system of claim 3, wherein the sequences of instructions, when executed, further cause the at least one processor to eliminate minor differences in personally identifiable information between the first set of data subject records and second set of data subject records such that anonymous identifiers from a particular data subject in the first set of data subject records and second set of data subject records will match.

5. The system of claim 4, wherein the first type of personally identifiable information and the second type of personally identifiable information are different.

6. The system of claim 5, wherein the sequences of instructions, when executed, further cause the at least one processor to perform identity resolution against the first set of opt-out records to augment the first set of opt-out records with anonymous identifiers and to perform identity resolution against the second set of opt-out records to augment the second set of opt-out records with anonymous identifiers.

7. The system of claim 6, wherein the sequences of instructions, when executed, further cause the at least one processor to translate anonymous identifiers in the first set of data subject plus metadata records to first destination identifiers and substitute the first destination identifiers with anonymous identifiers, and to translate anonymous identifiers in the second set of data subject plus metadata records to second destination identifiers and substitute the second destination identifiers with anonymous identifiers.

8. A computerized method for managing multi-controller opt-outs, comprising:
performing identity resolution against a plurality of sets of data subject records in order to identify a data subject associated with each of the data subject records in the plurality of sets of data subject records;
augmenting each of the data subject records in the plurality of sets of data subject records with metadata comprising a controller identifier uniquely associated with a controller from a plurality of controllers in order to produce a plurality of sets of data subject plus metadata records;
building a combined dataset by combining data subject plus metadata records from the plurality of sets of data subject plus metadata records; and
using a plurality of sets of opt-out records, each of the sets of opt-out records comprising a list of opted-out data subjects and associated personally identifiable opt-out information, applying an opt-out service against the combined dataset to suppress records in the combined dataset matching with any of the records in the plurality of sets of opt-out records, wherein the list of opted-out data subjects comprises persons who have requested that processing of their personal data be restricted, and wherein no personally identifiable information from any one of the plurality of controllers is shared with any other one of the plurality of controllers.

9. The method of claim 8, further comprising the steps of pseudonymizing the data subject records in the plurality of sets of data subject records prior to performing identity resolution against the data subject records in the plurality of sets of data subject records.

10. The method of claim 9, wherein each of the data subject records in the plurality of sets of data subject records comprise data subject personally identifiable information, and further comprising the step of replacing the data subject personally identifiable information in each of the data subject records in the plurality of sets of data subject records with anonymous identifiers.

11. The method of claim 10, wherein the step of replacing the data subject personally identifiable information in each of the data subject records in the plurality of sets of data subject records with anonymous identifiers comprises the step of generating the anonymous identifiers from the data subject records in the plurality of sets of data subject records with a hashing technique.

12. The method of claim 10, further comprising the step of performing identity resolution to standardize the data subject personally identifiable information between the plurality of sets of data subject records such that anonymous identifiers for each particular data subject record that match from among the plurality of sets of data subject records will be identical.

13. The method of claim 12, further comprising the step of performing identity resolution against the plurality of sets of opt-out records to augment each of the opt-out records of the plurality of sets of opt-out records with supplemental data subject personally identifiable information.

14. The method of claim 13, further comprising the steps of translating anonymous identifiers in the plurality of sets of data subject records to destination identifiers, and transferring the plurality of sets of data subject records to at least one programmatic messaging platform.

15. A computerized multi-controller opt-out processing system, comprising:
at least one processor;
a non-transitory, computer-readable storage medium;
a pseudonymization routine implemented as code stored on the non-transitory, computer-readable storage medium and executable on the at least one processor, wherein the pseudonymization routine is configured to augment a plurality of data record sets, wherein each of the plurality of data record sets originates from a different controller, with metadata comprising an identifier keyed to one of the controllers from which the plurality of data record sets originated;
an identity resolution routine implemented as code stored on the non-transitory, computer-readable storage medium and executable on the at least one processor, wherein the identity resolution routine is configured to resolve a data subject identity for each of a plurality of records in the plurality of record data sets;
a build combined dataset routine implemented as code stored on the non-transitory, computer-readable storage medium and executable on the at least one processor, wherein the build combined dataset routine is configured to build a combined data set by combining the plurality of data record sets without deleting the metadata of any of the data sets in the plurality of data record sets; and
an opt-out service routine implemented as code stored on the non-transitory, computer-readable storage medium and executable on the at least one processor, wherein the opt-out service routine is configured to read a plurality of opt-out records each corresponding to a data record in the combined data set to suppress each corresponding data record in the combined data set, wherein the plurality of opt-out records each comprises a data subject corresponding to a person who has previously requested that processing of such person's personal data be restricted, and wherein no personally identifiable information from any controller is shared with any other controller.

16. The system of claim 15, wherein the pseudonymization routine is further configured to convert personally identifiable information in each record in the plurality of data record sets to an internal anonymous identifier.

17. The system of claim 16, wherein the identity resolution routine is further configured to resolve a data subject from opt-out records in a plurality of opt-out record sets and augment each of the opt-out records in the plurality of opt-out record sets with supplemental data concerning a corresponding data subject.

18. The system of claim 17, further comprising a map identifiers to destination routine implemented as code stored on the non-transitory, computer-readable storage medium and executable on the at least one processor, wherein the map identifiers to destination routine is configured to translate the anonymous identifiers to destination identifiers in the combined data set.

19. The system of claim 18, wherein the pseudonymization routine is further configured to convert personally identifiable information in each record in the plurality of data record sets to the internal anonymous identifiers by applying a hashing routine.

\* \* \* \* \*